United States Patent
Jing et al.

(10) Patent No.: US 10,787,589 B2
(45) Date of Patent: Sep. 29, 2020

(54) DRY ERASE ARTICLE

(71) Applicant: 3M INNOVATIVE PROPERTIES COMPANY, St. Paul, MN (US)

(72) Inventors: Naiyong Jing, St. Paul, MN (US); Jun Ma, Woodbury, MN (US); Erika Saffer, Minneapolis, MN (US); David M. Mahli, Woodbury, MN (US); Gezahegn D. Damte, Cottage Grove, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 16/484,518

(22) PCT Filed: Feb. 19, 2018

(86) PCT No.: PCT/IB2018/050817
§ 371 (c)(1),
(2) Date: Aug. 8, 2019

(87) PCT Pub. No.: WO2018/150308
PCT Pub. Date: Aug. 23, 2018

(65) Prior Publication Data
US 2020/0002564 A1  Jan. 2, 2020

Related U.S. Application Data

(60) Provisional application No. 62/459,335, filed on Feb. 15, 2017.

(51) Int. Cl.
*B43L 1/00*  (2006.01)
*C09D 135/02*  (2006.01)
(Continued)

(52) U.S. Cl.
CPC ............ *C09D 135/02* (2013.01); *B43L 1/002* (2013.01); *C08F 220/34* (2013.01);
(Continued)

(58) Field of Classification Search
USPC ........ 434/408, 416, 421, 425; 156/290, 295; 428/353, 354
See application file for complete search history.

(56) References Cited

U.S. PATENT DOCUMENTS

| 5,708,048 A | 1/1998 | Medford |
| 5,888,594 A | 3/1999 | David |

(Continued)

FOREIGN PATENT DOCUMENTS

| CN | 1778749 | 5/2006 |
| CN | 202829840 | 3/2013 |

(Continued)

OTHER PUBLICATIONS

Bragg, "The Form Birefringence of Macromolecules", Acta Crystallographica, 1953, vol. 06, pp. 865-867.

(Continued)

*Primary Examiner* — Kurt Fernstrom
(74) *Attorney, Agent, or Firm* — Eric E. Silverman (57) ABSTRACT

Dry erase articles are described comprising a writable surface layer comprising a cured hardcoat composition comprising the reaction product of certain low surface energy compound(s). In one embodiment, the compound(s) comprise a C18-C36 hydrocarbon group and an ethylenically unsaturated group. In another embodiment, a mixture of compounds is utilized, the mixture comprising first compounds comprising a C18-C36 hydrocarbon group and an ethylenically unsaturated group and second compounds comprising a C8-C17 hydrocarbon group and an ethyleni- (Continued)

cally unsaturated group, wherein the first and second compound are present at a weight ratio of 3:2 to 4:1.

24 Claims, 1 Drawing Sheet

(51) Int. Cl.
    *C08F 220/34*     (2006.01)
    *C08F 222/10*     (2006.01)
    *C09D 5/00*     (2006.01)
    *C09D 133/14*     (2006.01)

(52) U.S. Cl.
    CPC .......... *C08F 222/1006* (2013.01); *C09D 5/00* (2013.01); *C09D 133/14* (2013.01); *C08F 220/343* (2020.02); *C08F 222/105* (2020.02); *C08F 2800/20* (2013.01)

(56) References Cited

U.S. PATENT DOCUMENTS

| | | | |
|---|---|---|---|
| 6,660,354 | B2 | 12/2003 | Suwa |
| 6,696,157 | B1 | 2/2004 | David |
| 6,991,695 | B2 | 1/2006 | Tait |
| 7,099,083 | B2 | 8/2006 | Johnson |
| 7,173,778 | B2 | 2/2007 | Jing |
| 7,199,197 | B2 | 4/2007 | Caldwell |
| 7,279,210 | B2 | 10/2007 | Hulteen |
| 9,340,683 | B2 | 5/2016 | Jing |
| 9,527,336 | B2 * | 12/2016 | Mahli ................. B43L 1/00 |
| 10,280,333 | B2 * | 5/2019 | Shah ................... C08G 18/792 |
| 2006/0003307 | A1 | 1/2006 | Hester et al. |
| 2006/0024461 | A1 | 2/2006 | Gustafson et al. |
| 2007/0142517 | A1 * | 6/2007 | Anderson, Sr. ...... C09D 175/06 |
| | | | 524/261 |
| 2010/0092671 | A1 * | 4/2010 | Goscha ................ B43L 1/00 |
| | | | 427/256 |
| 2010/0275815 | A1 | 11/2010 | Dave |
| 2011/0143330 | A1 | 6/2011 | Shimada et al. |
| 2012/0009396 | A1 | 1/2012 | Sikka |
| 2012/0312192 | A1 | 12/2012 | Detty |
| 2013/0029311 | A1 | 1/2013 | Goscha |
| 2013/0164730 | A1 * | 6/2013 | Gustafson ........... B43L 1/002 |
| | | | 434/408 |
| 2014/0329012 | A1 | 11/2014 | Mahli |
| 2015/0184021 | A1 * | 7/2015 | Nachtman ............ B43L 1/00 |
| | | | 523/456 |
| 2015/0299500 | A1 | 10/2015 | Haraguchi |
| 2016/0355698 | A1 * | 12/2016 | Harris ................. C08F 265/06 |
| 2018/0258312 | A1 * | 9/2018 | Cordero Basave ........... C08G 59/4057 |
| 2019/0153250 | A1 * | 5/2019 | Donbrosky, Jr. ...... C09D 11/16 |

FOREIGN PATENT DOCUMENTS

| | | |
|---|---|---|
| JP | H11-209650 A | 8/1999 |
| JP | 2011-143672 A | 7/2011 |
| JP | 2011136490 | 7/2011 |
| JP | 2012-213933 A | 11/2012 |
| WO | WO 1999-36248 | 7/1999 |
| WO | WO 2009-076389 | 6/2009 |
| WO | WO 2011-094342 | 8/2011 |
| WO | WO 2012-173803 | 12/2012 |
| WO | WO 2018-150298 | 8/2018 |

OTHER PUBLICATIONS

Ito, "Crystalline Ultrasmooth Self-Assembled Monolayers of Alkylsilanes for Organic Field-Effect Transistors", Journal of American Chemical Society, 2009, vol. 131, No. 26, pp. 9396-9404.
International Search Report for PCT International Application No. PCT/IB2018/050817, dated May 17, 2018, 4 pages.

\* cited by examiner

DRY ERASE ARTICLE

CROSS REFERENCE TO RELATED APPLICATIONS

This application is a national stage filing under 35 U.S.C. 371 of PCT/IB2018/050817, filed Feb. 9, 2018, which claims the benefit of U.S. Provisional Application No. 62/459,335, filed Feb. 15, 2017, the disclosure of which is incorporated by reference in its/their entirety herein.

SUMMARY

Although various dry erase articles have been described, a continuing need exits for surfaces that are writable and exhibit improved erasability, such as the ability to completely remove permanent marker ink with a dry paper towel.

In one embodiment, a dry erase article is described comprising a writable surface layer comprising a cured hardcoat composition comprising the reaction product of certain low surface energy compound(s).

In one embodiment, the compound(s) comprise a C18-C36 hydrocarbon group and an ethylenically unsaturated group.

In another embodiment, a mixture of compounds is utilized, the mixture comprising first compounds comprising a C18-C36 hydrocarbon group and an ethylenically unsaturated group and second compounds comprising a C8-C17 hydrocarbon group and an ethylenically unsaturated group, wherein the first and second compound are present at a weight ratio of 3:2 to 4:1.

The reaction product of the compound or mixture of compounds is typically present in an amount of at least 2.8 wt.-% and less than 9.5 wt.-% based on the total weight of the cured hardcoat or writable surface layer.

BRIEF DESCRIPTION OF DRAWING

The invention is further explained with reference to the drawing wherein.

These FIGURES are not to scale and are intended to be merely illustrative and not limiting.

DETAILED DESCRIPTION OF ILLUSTRATIVE EMBODIMENTS

Figure 1:
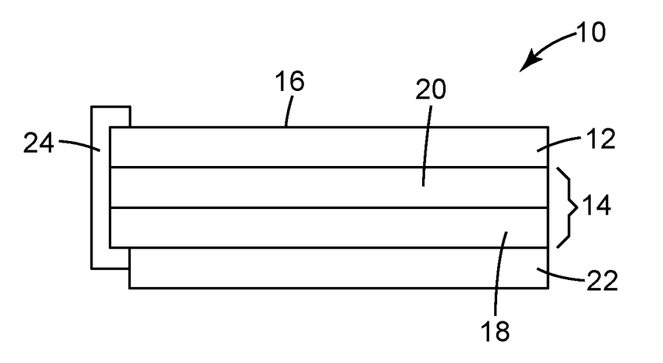
FIG. 1 is a schematic view of an illustrative embodied article.

FIG. 1 depicts an illustrative dry erase article 10 comprising a writable surface layer 12 and optional backing member 14. In some embodiments, backing member 14 comprises structural member 18 and optional primer layer 20 to achieve desired interply adhesion to the writable surface layer 12. In some embodiments, article 10 may further comprise optional adhesive 22 on its back side, e.g., shown here on the back side of backing member 14, adhesive 22 providing means to adhere article 10 to another substrate or surface as desired. In some embodiments, article 10 may further comprise frame member 24 on one or more edge portions to secure the component members of article 10 together, facilitate handling of article 10, provide means of attaching article 10 to a supporting surface, etc.

In some embodiments, the base member 14 consists essentially of or has a surface comprising an organic polymer material.

Illustrative examples of organic polymeric materials include polyester (e.g., polyethylene terephthalate (PET), polyethylene naphthalate (PEN), polybutyleneterephthalate), polyolefins (e.g., polypropylene including biaxially oriented polypropylene (BOPP), simultaneously biaxially-oriented polypropylene (S-BOPP), polyethylene), and ethylene or propylene copolymers), melamine resin, polyvinyl chloride, polycarbonate, allyldiglycol carbonate, polyacrylates, such as poly(methylmethacrylate), polystyrene, polysulfone, polyethersulfone, homo-epoxy polymers, epoxy addition polymers with polydiamines, polydithiols, polyethylene copolymers, cellulose esters such as acetate (e.g. TAC) and butyrate, biopolymers such polylactic acid based polymers, and blends thereof.

The organic polymeric base member may optionally further comprise additional organic or inorganic layers (not shown). Such additional layers may comprise glass, metal sheeting, paper, cardboard, knitted materials, fabrics, or the like.

In other embodiments, the base member may comprise an inorganic substrate such as a siliceous material (e.g. glass) or metal.

The base member may be opaque or light-transmissive (e.g. translucent or transparent). The term light-transmissive means transmitting at least about 85% of incident light in the visible spectrum (about 400 to about 700 nm wavelength). Substrates may be colored.

Base members used herein may be flexible or inflexible as desired.

In some embodiments, the base member will be substantially self-supporting, i.e., sufficiently dimensionally stable to hold its shape as it is moved, used, and otherwise manipulated. In some embodiments, the article will be further supported in some fashion, e.g., with a reinforcing frame, adhered to a supporting surface, etc.

In some embodiments, the base member may be provided with graphics on the surface thereof or embedded therein, such as words or symbols as known in the art, which will be visible through the overlying overcoat.

In many embodiments the base member will be substantially planar and may be characterized as a (e.g. preformed) polymeric film. However, the base member but may also be configured in curved, complex, as well as three-dimensional shapes.

The thickness of the base member can vary and will typically depend on the intended use of the final article. In some embodiments, base member (e.g. film) thickness is less than about 0.5 mm and typically between about 0.02 and about 0.2 mm.

Organic polymer base (e.g. film) members can be formed using conventional filmmaking techniques. The base member 14 can be treated to improve adhesion with the adjacent any. Exemplary of such treatments include chemical treatment, corona treatment (e.g., air or nitrogen corona), plasma, flame, or actinic radiation. Interlayer adhesion can also be improved with the use of an optional tie layer or primer applied.

When the finished articles are intended to be used in display panels, the writable member 12, and other components (e.g. adhesive 22, primer 20) of article 10 are also typically light transmissive, as previously described.

Suitable light transmissive optical film base members include for example multilayer optical films (e.g. U.S. Pat. No. 6,991,695 (Tait et al.) and WO 99/36248 (Neavin et al.), microstructured films such as retroreflective sheeting and brightness enhancing films (e.g. reflective or absorbing), polarizing films, diffusive films, as well as (e.g. biaxial)

retarder films and compensator films such as described in U.S. Pat. No. 7,099,083 (Johnson et al.).

At least a portion of the front surface of the writable member 12, and in typical embodiments the entire front surface thereof comprises a cured hardcoat composition comprising a minor concentration of the reaction product of a compound comprising a C18-C36 hydrocarbon group and an ethylenically unsaturated group.

The compound is typically of Formula (I)

wherein $R^1$ is a C18-C36 hydrocarbon group; L is a covalent bond, an atom (e.g. heteroatom), or a (e.g. hydrophobic) divalent liking group; and $R^2$ is an ethylenically unsaturated group.

In Formula (I), group $R^1$ is independently a C18-C36 alkyl, aryl, or combination thereof (e.g. alkylaryl or arylalkyl). Each $R^2$ is independently an ethylenically unsaturated group such a (meth)acrylate or vinyl. In typical embodiments, group $R^1$ is a linear alkylene group. Further, the compound is typically a solid at 25° C.

Notably $R^1$ is free of fluorine substituents and free of silicone substituents such as dialkyl(methyl) siloxane repeat units. The compound is also typically free of hydrophilic groups such as in the case of polymerizable non-ionic surfactants.

Compounds wherein $R^1$ is a C18 include for example stearyl acrylate, also known as octadecyl acrylate, commercially available from Sartomer under the trade designations "SR 257" and "SR 586"; as well as octedecyl vinyl ether, commercially available from TCI America.

Such compounds are available at various levels of purity. When the purity is less than 100%, the difference typically comprises one or more other compounds according to Formula 1 wherein $R^1$ is less than C18 and typically ranges from C8-C17. Thus, the hardcoat may comprise the reaction products of a mixture of compounds according to Formula 1 wherein at least 80, 85, 90, or 95 wt.-% of the total amount of compound is according to Formula 1 wherein $R^1$ is C18 and at least 5, 10, 15, or 20 wt.-% of the total amount of compounds is according to Formula 1 wherein $R^1$ is C8-C17.

In some embodiments, the hardcoat comprises the reaction product of a (e.g. highly pure) compound according to Formula 1 wherein $R^1$ is C18 and one or more compounds according to Formula 1 wherein $R^1$ is C8-C17 have been independently added to the hardcoat. In this embodiment, the hardcoat may comprise at least 25, 30, 35, 40, or 45 wt.-% of the reaction products of a mixture of compounds according to Formula 1 wherein $R^1$ is C8-C17.

The writable surface layer typically comprises greater than 2.5 wt.-% and less than 10 wt.-% of the reaction product of a compound or compounds comprising a C18-C36 hydrocarbon group and an ethylenically unsaturated group. In some embodiments, the amount is at least 2.8, 3.0, 3.2, 3.4, 3.6, 3.8 or 4 wt.-%. When the amount is 2.5 wt.-% or less, permanent marker cannot be completely removed with a dry paper towel. At concentrations of 9.5 wt.-% or greater poor permanent marker removability is also evident. This may be a result of the compounds comprising a C18-C36 hydrocarbon group and an ethylenically unsaturated group not being sufficiently compatible at such concentration.

Notably the permanent marker removability of the writable surface layer is provided by the compound of Formula 1. Thus, it is not necessary to include other low surface energy materials, such as fluorocarbon or silicone monomers, oligomers, or polymers. Hence, the writable surface layer and hardcoat composition can be free of such components.

The hardcoat of the writable surface layer is the reaction product of one or more polymerizable monomers, oligomers and/or polymers. In some embodiments, the hardcoat layer further comprises particles or nanoparticles.

Polymerizable materials may be, for example, free-radically polymerizable, cationically polymerizable, and/or condensation polymerizable. Useful polymerizable materials include, for example, acrylates and methacrylates, epoxies, polyisocyanates, and trialkoxysilane terminated oligomers and polymers.

Preferably, the polymerizable material comprises a free-radically polymerizable material, such as one or more multi-(meth)acrylate monomers and oligomers.

Useful multi-(meth)acrylate monomers and oligomers include:

(a) di(meth)acryl containing monomers such as 1,3-butylene glycol diacrylate, 1,4-butanediol diacrylate, 1,6-hexanediol diacrylate (HDDA), 1,6-hexanediol monoacrylate monomethacrylate, ethylene glycol diacrylate, alkoxylated aliphatic diacrylate, alkoxylated cyclohexane dimethanol diacrylate, alkoxylated hexanediol diacrylate, alkoxylated neopentyl glycol diacrylate, caprolactone modified neopentylglycol hydroxypivalate diacrylate, caprolactone modified neopentylglycol hydroxypivalate diacrylate, cyclohexanedimethanol diacrylate, diethylene glycol diacrylate, dipropylene glycol diacrylate, ethoxylated bisphenol A diacrylate, hydroxypivalaldehyde modified trimethylolpropane diacrylate, neopentyl glycol diacrylate, polyethylene glycol diacrylate, propoxylated neopentyl glycol diacrylate, tetraethylene glycol diacrylate, tricyclodecanedimethanol diacrylate, triethylene glycol diacrylate, tripropylene glycol diacrylate;

(b) tri(meth)acryl containing monomers such as glycerol triacrylate, trimethylolpropane triacrylate (TMPTA), ethoxylated triacrylates (e.g., ethoxylated trimethylolpropane triacrylate), propoxylated triacrylates (e.g., propoxylated glyceryl triacrylate, propoxylated trimethylolpropane triacrylate), trimethylolpropane triacrylate, tris(2-hydroxyethyl)isocyanurate triacrylate;

(c) higher functionality (meth)acryl containing monomer such as ditrimethylolpropane tetraacrylate, dipentaerythritol pentaacrylate, pentaerythritol triacrylate, ethoxylated pentaerythritol tetraacrylate, and caprolactone modified dipentaerythritol hexaacrylate.

Oligomeric (meth)acryl monomers such as, for example, urethane acrylates, polyester acrylates, and epoxy acrylates can also be employed.

In some embodiments, the (e.g. urethane (meth)acrylate) oligomers can be characterized as having an elongation of at least 20% and typically no greater than 200%; a Tg ranging from about 20 to 70° C.; and a tensile strength of at least 1,000 psi, or at least 5,000 psi. The tensile strength, elongation, and glass transition temperature (Tg) properties are based on a homopolymer prepared from such urethane (meth)acrylate oligomer.

Such (meth)acrylate monomers are widely available from vendors such as, for example, Sartomer Company of Exton, Pa.; Cytec Industries of Woodland Park, N; and Aldrich Chemical Company of Milwaukee, Wis.

In some embodiments, the hardcoat composition comprises (e.g. solely) a crosslinking agent comprising at least three (meth)acrylate functional groups. In some embodiments, the crosslinking monomer comprises at least four, five or six (meth)acrylate functional groups. Acrylate functional groups tend to be favored over (meth)acrylate functional groups.

Preferred commercially available crosslinking agent include for example trimethylolpropane triacrylate (commercially available from Sartomer Company, Exton, Pa. under the trade designation "SR351"), ethoxylated trimethylolpropane triacrylate (commercially available from Sartomer Company, Exton, Pa. under the trade designation "SR454"), pentaerythritol tetraacrylate, pentaerythritol triacrylate (commercially available from Sartomer under the trade designation "SR444"), dipentaerythritol pentaacrylate (commercially available from Sartomer under the trade designation "SR399"), ethoxylated pentaerythritol tetraacrylate, ethoxylated pentaerythritol triacrylate (from Sartomer under the trade designation "SR494"), dipentaerythritol hexaacrylate, and tris(2-hydroxy ethyl) isocyanurate triacrylate (from Sartomer under the trade designation "SR368".

Many of these monomers and oligomer can be characterized has having a high Tg, meaning that the homopolymer of such monomers or oligomers generally have a glass transition temperature of at least 40, 50, 60, 70, 80, 90 or 100° C.

In some embodiments, the hardcoat may comprise at least 5, 10, 15, or 20 wt.-%, typically ranging up to 30 wt-% of low Tg monomer or oligomers, meaning that the homopolymer of such monomers or oligomers generally have a glass transition temperature less than 25 or 0° C. Various, low Tg monomers and oligomer are known. One representative example is ethyoxylated trimethylolpropane triacrylate (Tg=-40° C.)

The hardcoat composition typically comprises a sufficient amount of high Tg polymerizable materials and nanoparticles or other particles such that the writable surface, or in other words the cured hardcoat composition inclusive of the compound comprising a C18-C36 hydrocarbon group, is non-tacky and has a glass transition temperature (Tg) well above room temperature. In typical embodiments, the Tg of the hardcoat is at least 40, 50, 60 70, 80, 90, or 100° C.

In some embodiments, the hardcoat comprises at least 60, 65, 70, 75, or 80 wt.-% of polymerized units of ethylenically unsaturated monomer or oligomers having at least two ethylenically unsaturated groups. In some embodiments, the hardcoat comprises at least 60, 65, 70, 75, or 80 wt.-% of polymerized units of ethylenically unsaturated monomer or oligomers having at least three, four, or five ethylenically unsaturated groups.

Depending on the choice of polymerizable material, the precursor composition may, optionally, contain one or more curatives that assist in polymerizing the polymerizable material. The choice of curative for specific polymerizable materials depends on the chemical nature of the copolymerizable material. For example, in the case of epoxy resins, one would typically select a curative known for use with epoxy resins (e.g., dicyandiamide, onium salt, or polymercaptan). In the case of free-radically polymerizable resins, free radical thermal initiators and/or photoinitiators are useful curatives.

Typically, the optional curative(s) is used in an amount effective to facilitate polymerization of the monomers and the amount will vary depending upon, for example, the type of curative, the molecular weight of the curative, and the polymerization process. The optional curative(s) is typically included in the precursor composition in an amount in a range of from about 0.01 percent by weight to about 10 percent by weight, based on the total weight of the precursor composition, although higher and lower amounts may also be used. The hardcoat precursor composition may be cured, for example, by exposure to a thermal source (e.g., heat, infrared radiation), electromagnetic radiation (e.g., ultraviolet and/or visible radiation), and/or particulate radiation (e.g., electron beam of gamma radiation).

Useful free-radical photoinitiators include, for example, benzoin ethers such as benzoin methyl ether and benzoin isopropyl ether, substituted benzoin ethers (e.g., anisoin methyl ether), substituted acetophenones (e.g., 2,2-dimethoxy-2-phenylacetophenone), substituted alpha-ketols (e.g., 2-methyl-2-hydroxypropiophenone), benzophenone derivatives (e.g., benzophenone), and acylphosphine oxides. Exemplary commercially available photoinitiators include photoinitiators under the trade designation "IRGACURE" (e.g., IRGACURE™ 651, IRGACURE™ 184, and IRGACURE™ 819) or "DAROCUR" (e.g., DAROCUR™ 1173, DAROCUR™ 4265) from Ciba Specialty Chemicals, Tarrytown, N.Y., and under the trade designation "LUCIRIN" (e.g., "LUCIRIN TPO") from BASF, Parsippany, N.J.

In some embodiments, the hardcoat coating composition and writable surface layer comprises little or no nanoparticles. Thus, the concentration of nanoparticle is less than 10, 5, 4, 3, 2, or 1 wt.-% of the total cured hardcoat or writable surface layer.

In other embodiments, the hardcoat composition and writable surface layer comprises nanoparticles. Nanoparticles may comprise a range of particle sizes over a known particle size distribution for a given material. In some embodiments, the average particle size may be within a range from about 1 nm to about 100 nm. Particle sizes and particle size distributions may be determined in a known manner including, for example, by transmission electron microscopy (TEM). Suitable nanoparticles can comprise any of a variety of materials such as metal oxides selected from alumina, tin oxide, antimony oxide, silica, zirconia, titania and combinations of two or more of the foregoing. Surface-modified colloidal nanoparticles can be substantially fully condensed.

In some embodiments, silica nanoparticles can have a particle size ranging from about 5 to about 75 nm. In some embodiments, silica nanoparticles can have a particle size ranging from about 10 to about 30 nm. Silica nanoparticles can be present in the cured hardcoat composition in an amount from about 10 to about 95 percent by weight. In some embodiments, silica nanoparticles are present in an amount of at least 15, 20, or 25 wt.-% of the total cured hardcoat or writable surface layer. The amount of silica nanoparticles is typically no greater than 70 wt.-% of the cured hardcoat or writable surface layer. In some embodiments, the amount of silica nanoparticles is less than 35 or 30 wt.-% of the cured hardcoat or writable surface layer, Silica nanoparticles suitable for use are commercially available from Nalco Chemical Co. (Naperville, Ill.) under the product designation NALCO™ Colloidal Silicas. Suitable silica products include NALCO™. Products 1040, 1042, 1050, 1060, 2327 and 2329. Suitable fumed silica products include for example, products sold under the tradename AEROSIL™ series OX-50, -130, -150, and -200 from DeGussa AG, (Hanau, Germany), and CAB—O-SPERSE™ 2095, CAB—O-SPERSE™ A105, CAB-O-SIL™ MS from Cabot Corp. (Tuscola, Ill.).

Nanoparticles can be surface modified which refers to the fact that the nanoparticles have a modified surface so that the nanoparticles provide a stable dispersion. "Stable dispersion" refers to a dispersion in which the colloidal nanoparticles do not agglomerate after standing for a period of time, such as about 24 hours, under ambient conditions, e.g., room temperature (about 20 to about 22.degree. C.), and atmospheric pressure, without extreme electromagnetic forces. The surface-treatment stabilizes the nanoparticles so that the particles will be well dispersed in the coatable composition and results in a substantially homogeneous composition. Furthermore, the nanoparticles can be modified over at least a portion of its surface with a surface treatment agent so that the stabilized particle can copolymerize or react with the coatable composition during curing.

Metal oxide nanoparticles can be treated with a surface treatment agent to make them suitable for use in the present invention. In general, a surface treatment agent has a first end that will attach to the particle surface (covalently, ionically or through strong physiosorption) and a second end that imparts compatibility of the particle with the coatable composition and/or reacts with coatable composition during curing. Examples of surface treatment agents include alcohols, amines, carboxylic acids, sulfonic acids, phosphonic acids, silanes and titanates. The type of treatment agent can depend on the nature of the metal oxide surface. For example, silanes are typically preferred for silica and other siliceous fillers. Surface modification can be accomplished either subsequent to mixing with the coatable composition or after mixing. It may be preferred in the case of silanes to react the silanes with the particle or nanoparticle surface before incorporation into the coatable composition. The amount of surface modifier can depend on factors such as particle size, particle type, modifier molecular weight, and modifier type. In general, a monolayer of modifier is attached to the surface of the particle. The attachment procedure or reaction conditions required also depend on the surface modifier used. For silanes, surface treatment may take place at elevated temperatures under acidic or basic conditions during a period of about 1 hour up to about 24 hours.

Surface treatment agents are known in the art including for example, isooctyl trimethoxy-silane, N-(3-triethoxysilyl-propyl) methoxyethoxyethoxyethyl carbamate (PEG3TES), SILQUEST™ A1230, N-(3-triethoxysilylpropyl) methoxyethoxyethoxyethyl carbamate (PEG2TES), 3-(methacryloyloxy)propyltrimethoxysilane, 3-acryloxypropyltrimethoxysilane, 3-(methacryloyloxy)propyltriethoxysilane, 3-(methacryloyloxy) propylmethyldimethoxysilane, 3-(acryloyloxypropyl)methyldimethoxysilane, 3-(methacryloyloxy)propyldimethylethoxysilane, 3-(methacryloyloxy) propyldimethylethoxysilane, vinyldimethylethoxysilane, phenyltrimethoxysilane, n-octyltrimethoxysilane, dodecyltrimethoxysilane, octadecyltrimethoxysilane, propyltrimethoxysilane, hexyltrimethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltris-isobutoxysilane, vinyltriisopropenoxysilane, vinyltris(2-methoxyethoxy)silane, styrylethyltrimethoxysilane, mercaptopropyltrimethoxysilane, 3-glycidoxypropyltrimethoxysilane, acrylic acid, methacrylic acid, oleic acid, stearic acid, dodecanoic acid, 2-[2-(2-methoxyethoxy)ethoxy]acetic acid (MEEAA), beta-carboxyethylacrylate, 2-(2-methoxyethoxy)acetic acid, methoxyphenyl acetic acid, and mixtures of two or more of the foregoing.

Surface modification of the particles in a colloidal dispersion can be accomplished in a number of ways. The process involves the mixture of an inorganic dispersion with surface modifying agents and, optionally, a co-solvent such as, for example, 1-methoxy-2-propanol, ethanol, isopropanol, ethylene glycol, N,N-dimethylacetamide and 1-methyl-2-pyrrolidinone. Co-solvent can be added to enhance the solubility of the surface modifying agents as well as the surface modified particles. The mixture comprising the inorganic sol and surface modifying agents is subsequently reacted at room or an elevated temperature, with or without mixing. In one method, the mixture can be reacted at about 85.degree. C. for about 24 hours, resulting in the surface-modified sol. In one method, where metal oxides are surface-modified, the surface treatment of the metal oxide can involve the adsorption of acidic molecules to the particle surface. The surface modification of the heavy metal oxide preferably takes place at room temperature.

In some embodiments, at least a portion of the nanoparticles may be surface modified in the manner described above. In other embodiments, all of the nanoparticles are surface modified. In still other embodiments, none of the nanoparticles are surface modified.

Although the permanent marker removability of the writable surface layer is provided by the compound of Formula 1 alone or in combination with the C8-C17 ethylenically unsaturated compound, the cured hardcoat and writable surface layer may optionally comprise other low surface energy materials, such as fluorocarbon or silicone monomers, oligomers, or polymers. These other low surface energy materials may be included for example to provide a smoother surface.

The optional low surface energy monomers, oligomers, or polymers may be chosen from the group of fluorocarbon, silicone, or hydrocarbon monomers. Fluorocarbon monomers suitable for the invention include but are not limited to perfluoro acrylates or methacrylates, such as trifluoro-ethylmethacrylate, $C_4F_9$ based sulfonamide acrylates and $C_3F_7$ based sulfonamide acrylates. Illustrative examples of fluorocarbon monomers useful herein include $C_4F_9SO_2N(CH_3)$ $C_2H_4O$—$CONHC_6H_5CH_2C_6H_5NHCO$— $OC_2H_4OCOCH$=$CH_2$ also known as MeFBSE-MDI-HEA, C4F9SO2N(CH3)C2H4O—CONH(CH2)6NHCO— OC2H4OCOCMe=CH2, $C_4F_9SO_2N(CH_3)C_2H_4O$—CONH $(CH_2)_6NHCO$—$OC_{12}H_{24}OCOCH$=$CH_2$, and $CF_3CH_2O$-CONH $C_6H_5CH_2C_6H_5NHCO$—$OC_2H_4OCOCH$=$CH_2$. Perfluoroacrylates suitable for the invention include $C_1$ to $C_6$ perfluoroalkyl acrylates or the type $RSO_2NMeC_2H_4OC(O)$ CH=$CH_2$, where R is $C_nF_{2n+1}$ and n is an integer from 1 to 6.

Another family of suitable fluorochemical monomers are described in U.S. Pat. No. 7,279,210 (Hulteen et al.) and U.S. Pat. No. 7,199,197 (Caldwell et al.). These fluoroacrylate monomers are represented by the formula:

wherein n is an integer in a range of from 1 to 6, inclusive, p is an integer in a range of from 2 to 30, inclusive; and R' is H, $CH_3$, or F, A is a hydrocarbylene group, and X is -continued , or wherein R is H or an alkyl group having 1 to 4 carbon atoms; m is an integer in a range of from 2 to 8, inclusive; $R_f$ is $C_nF_{2n+1}$; y is an integer in a range of from 0 to 6, inclusive; q is an integer in a range of from 1 to 8, inclusive.

In some embodiments, A is selected from the group consisting of —$C_6H_{12}$—,

;

Other fluorochemical additives suitable for the invention include perfluoropolyether urethane acrylates described in U.S. Pat. No. 7,173,778 (Jing et al.).

Fluorochemical oligomers suitable for use in dry erase articles of the invention include the commercially available chemicals FLUORAD™ FC-4430 and FC-4432 from 3M Company, St. Paul, Fluorochemical polymers suitable for use in dry erase articles of the invention include perfluoropolyether polymers with poly(alkylene oxide) repeat units, e.g., as described in PCT Application No. WO2009/076389 (Yang et al.).

Silicone monomers suitable for the invention include but are not limited to silicone acrylate monomers. Exemplary silicone acrylate monomers suitable for use herein include BYK-371 Reactive Silicone Surface Additive, BYK-373 Reactive Silicone Surface Additive. BYK-377 Reactive Silicone Surface Additive, BYK-UV 3500 Surface Additives for Radiation Curable Systems, BYK-UV 3530 Surface Additives for Radiation Curable Systems, BYK-UV 3570 Surface Additives for Radiation Curable Systems, and BYK SILCLEAN™ 3710 Surface Additives to Improve Surface Cleanability from BYK-Chemie GmBH, Wesel, Germany. Other suitable silicone monomers include TEGORAD™ 2100, TEGORAD™ 2200N, TEGORAD™ 2250, and TEGORAD™ 2300 silicone acrylate monomers from Evonik Goldschmidt Corporation, Hopewell, Va.

The polymerizable hardcoat compositions can be formed by dissolving the free-radically polymerizable material(s) and ethylenically unsaturated C18-C36 compound in a compatible organic solvent and then combined with the nanoparticle dispersion at a concentration of about 60 to 70 percent solids. A single organic solvent or a blend of solvents can be employed.

Suitable organic solvents for use in the surface layer coating composition include, but are not limited to, aliphatic alcohols such as, for example, methanol, ethanol, and isopropanol; ketones such as, for example, acetone and methyl ethyl ketone; esters such as, for example, ethyl acetate and methyl formate; ethers such as, for example, diethyl ether, diisopropyl ether, methyl t-butyl ether, and dipropylene glycol monomethyl ether (DPM); alkanes such as, for example, heptane, decane, and other paraffinic (i.e., oleofinic) solvents; as well as various fluorinated solvents.

The hardcoat composition can be applied as a single or multiple layers to a (e.g. display surface or film) substrate using conventional film application techniques. Thin films can be applied using a variety of techniques, including dip coating, forward and reverse roll coating, wire wound rod coating, and die coating. Die coaters include knife coaters, slot coaters, slide coaters, fluid bearing coaters, slide curtain coaters, drop die curtain coaters, and extrusion coaters among others. Many types of die coaters are described in the literature. Although it is usually convenient for the substrate to be in the form of a roll of continuous web, the coatings may be applied to individual sheets.

The hardcoat composition is dried in an oven to remove the solvent and then cured for example by exposure to ultraviolet radiation using an H-bulb or other lamp at a desired wavelength, preferably in an inert atmosphere (less than 50 parts per million oxygen). The reaction mechanism causes the free-radically polymerizable materials to cross-link.

The thickness of the cured hardcoat surface layer is typically at least 0.5 microns, 1 micron, or 2 microns. The thickness of the hardcoat layer is generally no greater than 50 microns or 25 microns. Preferably the thickness ranges from about 5 microns to 15 microns.

The surface layer described herein is hydrophobic. The term "hydrophobic" refers to a surface on which drops of water or aqueous solutions exhibit a static water contact angle of at least 50 degrees, at least 60 degrees, at least 70 degrees, at least 80 degrees, or at least 85 degrees. In some embodiments, the static water contact angle is less than 100, 95 or 90 degrees.

In some embodiments, the surface layer is easy to clean, as evidenced by the dry erase and permanent marker removability. Illustrative applications where easy cleanability is desired include windows, electronic device screens, work surfaces, appliances, door and wall surfaces, signs, etc. In this embodiment, the surface layer may not be writable.

In some embodiments, the article is a dry erase article or component thereof. The dry erase article can further comprise other optional components such as frames, means for storing materials and tools such as writing instruments, erasers, cloths, note paper, etc., handles for carrying, protective covers, means for hanging on vertical surfaces, easels, etc.

Other articles that include writable surfaces file folders, notebooks, binders etc. where effective writability coupled with later easy removal of the writing is desired.

The writable surface layers generally exhibit no dewetting with both dry erase markers and permanent markers.

As described in WO 2011/094342, solvent compositions of dry erase markers are typically listed on the marker or reported on the MSDS for the marker. Common solvents for dry erase markers include, for example, ethanol, isopropanol, methyl isobutyl ketone and n-butyl acetate. One solvent with a high surface tension is n-butyl acetate, having a surface tension of about 25 mJ/m². Therefore, in some embodiments, a dry ease surface can be wettable by solvents with a surface tension of about 25 mJ/m² or less. In one embodiment, the surface energy of the writing surface is within the range of about 26 mJ/m² to less than about 38 mJ/m². In another embodiment, the surface energy of the writing surface is within the range of about 30 mJ/m² to less than about 38 mJ/m².

Permanent markers can have many of the same solvents as dry erase markers. However, permanent markers are generally "waterproof" after evaporation of the solvent due to the other components of the permanent markers and are not dry erasable. For example, if a 1 inch filled square is drawn on a piece of glass and allowed to dry for 24 hours, the ink from a dry erase marker can typically be removed using the test for dry erase marker writing erasability described in the forthcoming examples. However, a 1 inch filled square drawn on a piece of glass with a permanent marker (e.g. black Sharpie™) and allowed to dry for 24 hours cannot be removed using this same test.

In contrast to US2014/0329012 that describes removing permanent marker writing from the surface by simply applying water (e.g., tap water at room temperature) and/or water vapor (e.g., a person's breath) and wiping, permanent marker writing can be removed from with a dry paper towel according to the test method described in the examples.

A variety of other dry eraser types can be used. Illustrative examples of eraser materials include pressed and woven felts of synthetic and/or natural (e.g., wool) materials, cellulose, foam rubber, neoprene, cloth, pile fabrics, melamine fibers, and similar materials have been used. Preferably the eraser materials chosen is not abrasive in nature so as to enhance the durability of the writing surface.

EXAMPLES

| Material | Trade Name | Supplier and address |
|---|---|---|
| White, waxy solid that melts at approximately 31° C. and is composed of approximately 95% C18 acrylate. | SR 586 | Sartomer, PA |
| Octadecyl acrylate 60-80% and hexadecyl acrylate 20-40% (Tg = 35° C.) | SR 257 | Sartomer |
| Octadecyl vinyl ether - 85% purity, melting point 27° C. (C18VE) | Cas No. 930-02-9 Product Number O 0019 | TCI America |
| Pentaerythritol triacrylate (Tg = 103° C.) | SR444 | Sartomer |
| Polyethylene glycol (400) diacrylate (Tg = 104° C.) | SR344 | |
| Pentaerythritol tetracrylate (Tg = 103° C.) | SR 295 | Sartomer |
| Pentaerythritol pentacrylate (Tg = 90° C.) | SR 399 | Sartomer |
| Ethyoxylated trimethylolpropane triacrylate (Tg = −40° C.) | SR454 | |
| Isodecyl acrylate (Tg = −40° C.) | SR 395 | Sartomer |
| Tris (2-hydroxy ethyl) isocyanurate triacrylate | SR 368D | Sartomer |
| Ethyoxylated (4) pentaerythritol tetracrylate (Tg = 2° C.) | SR 494 | Sartomer |
| Hyperbranched polyester acrylate oligomer, functionality 8 (Tg = 74° C.) | CN 2304 | Sartomer |
| Aliphatic urethane acrylate, functionality 10, viscosity 2100 at 60° C. | EBECRYL-8415 | Allnex |
| Lauryl acrylate, 90% $CH_2$=$CHCOOC_{12}H_{25}$ | SR 335 | Sartomer |
| Sharpie permanent markers | None | Sanford Co, Bellwood, IL |
| 1-Hydroxycyclohexyl phenyl ketone photoinitiator | IRGACURE-184 | BASF |
| 3-(Trimethoxysilyl)propyl methacrylate | A-174 | Momentive Performance Materials Inc., Waterford, NY |
| Silica sol, 40 wt.-%, 20 nanometer average particle size, | NALCO 2327 | Nalco Corporation, Naperville, IL |
| White PET (7 mil (105 micrometer) thick, white polyester film chemically primed on both sides | W54B | Mitsubishi PET film LLC, Greenville, SC |
| Clear PET (3 mil (75 micrometer) thick | | |
| Isopropyl alcohol (IPA) | | Avantor Performance Materials, LLC, Center Valley, PA |
| Methyl ethyl ketone (MEK) | | |
| 1-methoxy-2-propanol | | |
| Ethyl acetate (EtOAc) | | |
| Trifluoroethylmethacrylate (TFEMA) | | |
| MeFBSEA $C_4F_9SO_2NMeC_2H_4OC(O)CH$=$CH_2$ | | 3M |

Methods
Test for Permanent Marker Dewetting

Two colors of Sharpie permanent markers (one black and the other selected from red, green, or blue) were used to test samples prepared according to the Examples and Comparative Examples prepared as described below. The test samples were about 6 inches by 11 inches (15.0 cm by 27.9 cm) in size. A horizontal band (i.e., along the width of the samples) about 2.5 cm wide of the sample was tested. The first permanent marker was used to write the marker brand name on the left hand side of the 2.5 cm wide band and the second marker was used to write the same marker brand name on the right hand side of the 2.5 cm wide band. After marking the surfaces of the test samples, the markings were examined visually for signs of ink dewetting. Dewetting (i.e., beading-up) of the ink was evidenced by visual appearance of gaps in the ink line or a shrinking of the ink line.

Test for Permanent Marker Erasability

The surfaces of samples prepared according to the Examples and Comparative Examples described below marked with Sharpie permanent markers were evaluated for erasability by rubbing the marked surface of the samples with a paper towel. The marked samples were rubbed by hand, using moderate pressure (2.9 lbs per 1 in$^2$ of erasing medium contacting the surface), in a back and forth motion until either the marking was completely erased or until ten back and forth motions (three passes per second) had been completed (a total of 10 passes over the markings). The film samples were then visually evaluated and rated for erasability.

In a variation of this test method, the samples marked with Sharpie permanent markers was let sit for 24 hours which was about 22° C. (72° F.) in an air conditioned laboratory environment (i.e. room temperature aged (RT aged)). Then the test for permanent marker erasability described above was completed.

In another variation of this test method, the samples marked with Sharpie permanent markers was let sit for 48 hours in an oven set at about 50° C. (120° F.) (referred to herein after as oven aged). Then the test for permanent marker erasability described above was completed.

Static Water Contact Angle

Water contact angle measurements were performed on dried samples prepared according to Examples and Comparative Examples described below. Deionized water, obtained from Millipore Corporation (Billerica, Mass.). The contact angle analyzer used was a PGX+video contact angle analyzer from FIBRO System AB, Hagersten, Sweden. The contact angle was measured using a built-in camera on drops of water (0.5 μL) delivered by an integrated pump. The values reported are the average of at least 4 separate measurements.

Preparation of Surface Modified Silica Nanoparticles (SM-SiO$_2$)

A 12 liter flask was charged with 3000 g of aqueous colloidal silica solution NALCO 2327 and stirring was started. Then 3591 g of 1-methoxy-2-propanol was added. In a separate container, 189.1 g of 3-methacryloxypropyltrimethoxy silane (A-174) was mixed with 455 g of 1-methoxy-2-propanol. This pre-mix solution was added to the flask, rinsing with 455 g of 1-methoxy-2-propanol. The mixture was heated to 80° C. for about 16 hours. The mixture was cooled to 35° C. The mixture was set up for vacuum distillation (30 to 35 Torr (4-6.67 kPa), 35 to 40° C.) with a collection flask. An additional 1813.5 g of 1-methoxy-2-propanol was added to the reaction flask part way through the distillation. A total of 6784 g of distillate was collected. The mixture was tested for % solids by drying a small sample in a tared aluminum pan for 60 minutes in a 105° C. oven. The mixture was found to be 52.8% solids. An additional 250 g of 1-methoxy-2-propanol was added and the mixture was stirred. The % solids was tested and found to be 48.2%. The mixture was collected by filtering through cheesecloth to remove particulate debris.

General Coating Procedure

Coating solutions were prepared by mixing the desired amounts of acrylate components, if desired, a solvent, (such as isopropanol, methoxypropyl alcohol or methyl ethyl ketone) and a UV initiator (such as IRGACURE-184). The UV initiator was introduced into the coating solutions, typically 1 to 2 wt.-% with respect to the total weight of the acrylates. The solutions were coated using a #12 Meyer Bar on either clear or white PET substrate (as specified below). The resulting coatings were subsequently dried in an oven set at 80° C. for 2-5 minutes, and then, passed through a UV station at a rate of 40 feet/minute (12.20 meter/minute) for 3 times. The UV station was Fusion UV, Model MC-6RQN with 300 W H-bulb, made by Fusion UV Systems, Inc. of Gaithersburg, Md. The sample and the system was purged with nitrogen when exposed to UV light. The resulting prepared samples were subsequently subjected to permanent marker dewetting and erase tests described above.

Example 1

Example 1 samples A-E were prepared according to general coating procedure described above. The resulting coated samples were tested for permanent marker dewetting and erasability using the test methods described above. The composition of the coating solutions and the test results are summarized in Table 1, below.

TABLE 1

| | Parts (by wt.) in Coating solution | | | | |
|---|---|---|---|---|---|
| Component | Ex. 1A | Ex. 1B | Ex. 1C | Ex. 1D | Ex. 1E |
| SR 295 | 96 | 95 | 94 | 90 | 80 |
| SR 257 | 4 | 5 | 6 | 10 | 20 |
| IRGACURE 184 | | | | | |
| Permanent marker dewetting | None | None | None | None | None |
| Permanent marker removal | Removal | Removal | Removal | Poor removal | Poor removal |

None means no ink beading or dewetting was observed.

While not wishing to be bound by theory, samples Ex. 1D and Ex. 1E had poor surface texture possibly as a result of incomplete polymerization.

Example 2

Example 2 samples A-E were prepared according to general coating procedure described above. The resulting coated samples were tested for permanent marker dewetting and erasability using the test methods described above. The composition of the coating solutions and the test results are summarized in Table 2, below.

TABLE 2

| | Parts (by wt.) in Coating solution | | | | |
|---|---|---|---|---|---|
| Component | Ex. 2A | Ex. 2B | Ex. 2C | Ex. 2D | Ex. 2E |
| SR 399 | 96 | 95 | 94 | 90 | 80 |
| SR 257 | 4 | 5 | 6 | 10 | 20 |

TABLE 2-continued

| Component | Ex. 2A | Ex. 2B | Ex. 2C | Ex. 2D | Ex. 2E |
|---|---|---|---|---|---|
| | Parts (by wt.) in Coating solution | | | | |
| IRGACURE 184 | 2 | 2 | 2 | 2 | 2 |
| Permanent marker dewetting | None | None | None | None | None |
| Permanent marker removal | Removal | Removal | Removal | Poor removal | Poor removal |

While not wishing to be bound by theory, samples Ex. 1D and Ex. 1E had poor surface texture possibly as a result of incomplete polymerization.

Examples and Comparative Examples 3-24

Examples and Comparative Examples 3-27 were prepared according to general coating procedure described above. Where indicated, the components were added as a solution in a solvent. The resulting coated samples were tested for permanent marker dewetting and erasability using the test methods described above. The composition of the coating solutions and the test results for each Examples and Comparative Examples are summarized in the following tables.

TABLE 3

| Component | Ex. 3A | Ex. 3B | Ex. 3C |
|---|---|---|---|
| | Parts (by wt.) in Coating Solution | | |
| SR 494 (30 wt. % in IPA) | 94 | 95 | 96 |
| SR 257 (30 wt. % in IPA) | 6 | 5 | 4 |
| IRGACURE 184 (10 wt. % in IPA) | 2 | 2 | 2 |
| Permanent marker dewetting | None | None | None |
| Permanent marker removal | Removal | Removal | Removal |

TABLE 4

| Component | Ex. 4A | Ex. 4B | Ex. 4C |
|---|---|---|---|
| | Parts (by wt.) in Coating Solution | | |
| SR 368D (30 wt. % in IPA) | 94 | 95 | 96 |
| SR 257 (30 wt. % in IPA) | 6 | 5 | 4 |
| IRGACURE 184 (10 wt. % in IPA) | 2 | 2 | 2 |
| Permanent marker dewetting | None | None | None |
| Permanent marker removal | Removal | Removal | Removal |

TABLE 5

| Component | Ex. 5A | Ex. 5B | Ex. 5C |
|---|---|---|---|
| | Parts (by wt.) in Coating Solution | | |
| SR 2304 (30 wt. % in MEK) | 94 | 95 | 96 |
| SR 257 (30 wt. % in IPA) | 6 | 5 | 4 |
| IRGACURE 184 (10 wt. % in IPA) | 2 | 2 | 2 |
| Permanent marker dewetting | None | None | None |
| Permanent marker removal | Removal | Removal | Removal |

TABLE 6

| Component | Ex. 6A | Ex. 6B | Ex. 6C |
|---|---|---|---|
| | Parts (by wt.) in Coating Solution | | |
| EBECRYL 8415 (30 wt. % in MEK) | 94 | 95 | 96 |
| SR 257 (30 wt. % in IPA) | 6 | 5 | 4 |
| IRGACURE 184 (10 wt. % in IPA) | 2 | 2 | 2 |
| Permanent marker dewetting | None | None | None |
| Permanent marker removal | Removal | Removal | Removal |

TABLE 7

| Component | Comp. Ex. 7A | Comp. Ex. 7B | Comp. Ex. 7C |
|---|---|---|---|
| | Parts (by wt.) in Coating Solution | | |
| EBECRYL 8415 (30 wt. % in MEK) | 94 | 95 | 96 |
| SR 335 (30 wt. % in MEK) | 6 | 5 | 4 |
| IRGACURE 184 (10 wt. % in IPA) | 2 | 2 | 2 |
| Permanent marker dewetting | None | None | None |
| Permanent marker removal | No removal | No removal | No removal |

TABLE 8

| Component | Ex. 8A | Ex. 8B | Ex. 8C | Ex. 8D | Ex. 8E | Ex. 8F |
|---|---|---|---|---|---|---|
| | Parts (by wt.) in Coating Solution | | | | | |
| SR 295 (30 wt. % in IPA) | 95 | 96 | 97 | | | |
| SR 399 (30 wt. % in IPA) | | | | 95 | 96 | 97 |
| C18 VE (30 wt. % in IPA) | 5 | 4 | 3 | 5 | 4 | 3 |
| IRGACURE 184 (10 wt. % in IPA) | 2 | 2 | 2 | 2 | 2 | 2 |
| Permanent marker dewetting | None | None | None | None | None | None |
| Permanent marker removal | Removal | Removal | Removal | Removal | Removal | Removal |

TABLE 9

| Component | Parts (by wt.) in Coating Solution | | |
|---|---|---|---|
| | Ex. 9A | Ex. 9B | Ex. 9C |
| EBECRYL 8415 (30 wt. % in MEK) | 94 | 95 | 96 |
| C18 VE (30 wt. % in MEK) | 6 | 5 | 4 |
| IRGACURE 184 (10 wt. % in IPA) | 2 | 2 | 2 |
| Permanent marker dewetting | None | None | None |
| Permanent marker removal | Removal | Removal | Removal |

TABLE 10

| Component | Parts (by wt.) in Coating Solution | | |
|---|---|---|---|
| | Ex. 10A | Ex. 10B | Ex. 10C |
| EBECRYL 8415 (30 wt. % in IPA) | 97 | 96 | 95 |
| C18 VE (30 wt. % in IPA) | 3 | 4 | 5 |
| IRGACURE 184 (10 wt. % in IPA) | 2 | 2 | 2 |
| Permanent marker dewetting | None | None | None |
| Permanent marker removal | Removal | Removal | Removal |

TABLE 11

| Component | Parts (by wt.) in Coating Solution | | | | |
|---|---|---|---|---|---|
| | Ex. 11A | Ex. 11B | Ex. 11C | Ex. 11D | Ex. 11E |
| EBECRYL 8415 (30 wt. % in IPA) | 97 | 97 | 97 | 97 | 97 |
| SR 257 (30 wt. % in IPA) | 3 | | | | |
| C18 VE (30 wt. % in IPA) | | 3 | | | |
| SR 257:C18 VE (70:30 mix, 30 wt. % in IPA) | | | 3 | | |
| SR 257:C18 VE (50:50 mix, 30 wt. % in IPA) | | | | 3 | |
| SR 257:C18 VE (30:70 mix, 30 wt. % in IPA) | | | | | 3 |
| IRGACURE 184 (10 wt. % in IPA) | 2 | 2 | 2 | 2 | 2 |
| Permanent marker dewetting | None | None | None | None | None |
| Permanent marker removal | Removal | Removal | Removal | Removal | Removal |

TABLE 12

| Component | Parts (by wt.) in Coating Solution | | |
|---|---|---|---|
| | Comp. Ex. 12A | Comp. Ex. 12B | Comp. Ex. 12C |
| EBECRYL 8415 (20 wt. % in MEK) | 95 | 96 | 97 |
| SR 484 (C8-C10 mixture, 20 wt. % in MEK) | 5 | 4 | 3 |
| IRGACURE 184 (10 wt. % in IPA) | 2 | 2 | 2 |
| Permanent marker dewetting | None | None | None |
| Permanent marker removal | No removal | No removal | No removal |

TABLE 13

| Component | Parts (by wt.) in Coating solution | | | |
|---|---|---|---|---|
| | Ex. 13A | Ex. 13B | Ex. 13C | Ex. 13D |
| SR 295 (30 wt. % in IPA) | 97 | 96 | 95 | 94 |
| SR 586 (30 wt. % in MEK) | 3 | 4 | 5 | 6 |
| IRGACURE 184 (10 wt. % in MEK) | 3 | 3 | 3 | 3 |
| Permanent marker dewetting | None | None | None | None |
| Permanent marker removal (RT aged) | Removal | Removal | Removal | Removal |

TABLE 14

| Component | Parts (by wt.) in Coating Solution | | | |
|---|---|---|---|---|
| | Ex. 14A | Ex. 14B | Ex. 14C | Ex. 14D |
| SR 399 (30 wt. % in MEK) | 97 | 96 | 95 | 94 |
| SR 586 (30 wt. % in MEK) | 3 | 4 | 5 | 6 |
| IRGACURE 184 (10 wt. % in MEK) | 3 | 3 | 3 | 3 |
| Permanent marker dewetting | None | None | None | None |
| Permanent marker removal (RT aged) | Removal | Removal | Removal | Removal |

TABLE 15

| Component | Parts (by wt.) in Coating Solution | | | |
|---|---|---|---|---|
| | Ex. 15A | Ex. 15B | Ex. 15C | Ex. 15D |
| SR 295 (30 wt. % in IPA) | 95 | 95 | | |
| SR 399 (30 wt. % in MEK) | | | 95 | 95 |
| SR 586 (30 wt. % in MEK) | 5 | | 5 | |
| SR 257 (30 wt. % in IPA) | | 5 | | 5 |

TABLE 15-continued

| | Parts (by wt.) in Coating Solution | | | |
|---|---|---|---|---|
| Component | Ex. 15A | Ex. 15B | Ex. 15C | Ex. 15D |
| IRGACURE 184 (10 wt. % in MEK) | 3 | 3 | 3 | 3 |
| Permanent marker dewetting | None | None | None | None |
| Permanent marker removal (Oven aged) | Removal | Removal | Removal | Removal |

TABLE 16

| | Parts (by wt.) in Coating Solution | | |
|---|---|---|---|
| Component | Ex. 16A | Ex. 16B | Ex. 16C |
| SR 454 (30 wt. % in MEK) | 19.2 | | |
| SR 494 (30 wt. % in MEK) | | 19.2 | |
| HDDA:TMPTA (50:50 mix) | | | 19.2 |
| SR 399LV (30 wt. % in MEK) | 76.8 | 76.8 | 76.8 |
| SR 586 (30 wt. % in MEK) | 4 | 4 | 4 |
| IRGACURE 184 (10 wt. % in IPA) | 0.1 | 0.1 | 0.1 |
| Permanent marker dewetting | None | None | None |
| Permanent marker removal | Removal | Removal | Removal |

TABLE 17

| | Parts (by wt.) in Coating Solution | | | | | |
|---|---|---|---|---|---|---|
| Component | Ex. 17A | Ex. 17B | Ex. 17C | Ex. 17D | Ex. 17E | Ex. 17F |
| SR 295:SM-SiO$_2$ (70:30 mix) | 95 | | 90 | | 90 | |
| SR 295:SM-SiO$_2$ (50:50 mix) | | 95 | | 90 | | 90 |
| SR 257 (30 wt. % in IPA) | 5 | 5 | 5 | 5 | 5 | 5 |
| TFEMA (30 wt. % in IPA) | | | 5 | 5 | | |
| MeFBSEA (30 wt. % in MEK) | | | | | 5 | 5 |
| Permanent marker dewetting | None | None | None | None | None | None |
| Permanent marker removal | Removal | Removal | Removal | Removal | Removal | Removal |

TABLE 18

| | Parts (by wt.) in Coating Solution | | | | | |
|---|---|---|---|---|---|---|
| Component | Ex. 18A | Ex. 18B | Ex. 18C | Ex. 18D | Ex. 18E | Ex. 18F |
| SR 399:SM-SiO$_2$ (70:30 mix) | 95 | | 90 | | 90 | |
| SR 399:SM-SiO$_2$ (50:50 mix) | | 95 | | 90 | | 90 |
| SR 257 (30 wt. % in IPA) | 5 | 5 | 5 | 5 | 5 | 5 |
| TFEMA (30 wt. % in IPA) | | | 5 | 5 | | |
| MeFBSEA (30 wt. % in MEK) | | | | | 5 | 5 |
| Permanent marker dewetting | None | None | None | None | None | None |
| Permanent marker removal | Removal | Removal | Removal | Removal | Removal | Removal |

The addition of MeFBSEA or TFEMA in these samples was observed to help with surface leveling, allowing the cured coating to appear smoother.

TABLE 19

| | Parts (by wt.) in Coating Solution | | | |
|---|---|---|---|---|
| Component | Ex. 19A | Ex. 19B | Ex. 19C | Ex. 19D |
| SR 399:SM-SiO$_2$ (70:30 mix) | 95 | | | |
| SR 399:SM-SiO$_2$ (50:50 mix) | | 95 | | |
| SR 399:SM-SiO$_2$ (40:60 mix) | | | 95 | 90 |
| SR 257 (30 wt.-% in IPA) | 5 | 5 | 5 | 5 |
| TFEMA (30 wt.-% in IPA) | | | | 5 |
| Permanent marker dewetting | None | None | None | None |
| Permanent marker removal (RT aged) | Removal | Removal | Removal | Removal |

Note that Example 19 samples contained 2 wt. % of initiator IRGACURE 184.

TABLE 20

| Component | Parts (by wt.) in Coating Solution | |
|---|---|---|
| | Ex. 20A | Ex. 20B |
| SR 399:SM-SiO$_2$ (40:60 mix) | 95 | 90 |
| SR 586 (30 wt. % in MEK) | 5 | 5 |
| TFEMA (30 wt. % in IPA) | | 5 |
| Permanent marker dewetting | None | None |
| Permanent marker removal (RT aged) | Removal | Removal |

Note that Example 20 samples contained 2 wt. % of initiator IRGACURE 184.

TABLE 21

| Component | Parts (by wt.) in Coating Solution | | |
|---|---|---|---|
| | Ex. 21A | Ex. 21B | Ex. 21C |
| SR 295 (30 wt. % in MEK) | 95 | | |
| EBECRYL 8415 (30 wt. % in MEK) | | 95 | |
| SR 399LV (30 wt. % in MEK) | | | 95 |
| SR 257 (30 wt. % in IPA | 5 | 5 | 5 |
| IRGACURE 184 (10 wt. % in IPA) | 2 | 2 | 2 |
| Permanent marker dewetting | None | None | None |
| Permanent marker removal (Black marker) | Removal | Removal | Removal |
| Permanent marker removal (Red marker) | Removal | Removal | Removal |
| Permanent marker removal (RT aged, black marker) | Removal | Removal | Removal |
| Permanent marker removal (RT aged, red marker) | Removal | Removal | Removal |

TABLE 22A

| Sample | Coating Solution Composition | | PET Substrate | Cure Rate (m/min) | Permanent Marker Removal black/red (Static Contact Angle) |
|---|---|---|---|---|---|
| | Components | Parts (by wt.) | | | |
| Ex. 22A | SR 399/SR 257/ ESACURE | 95/5/2 | White, 7 mil | 20 | Removal/Removal (86.1) |
| Ex. 22B | SR 295/SR 257/ ESACURE | 95/5/2 | Clear, 3 mil | 20 | Removal/Removal (88.2) |
| Ex. 22C | SR 295/SR 257/ESACURE | 95/5/2 | Clear, 3 mil | 5 | Removal/Removal |
| Ex. 22D | SR 295/SR 257ESACURE | 95/5/2 | Clear, 3 mil | 30 | Removal/Removal |
| Ex. 22E | SR 399/SM SiO$_2$/SR 257 MeFBSEA/ ESACURE | 63/27/5/5/2 | White, 7 mil | 30 | Removal/Removal |

TABLE 23

| Component | Wt. % in solution | Wt. % in dry solid | Sharpie removable | Compatibility |
|---|---|---|---|---|
| Comp. Ex. 23A | | | | |
| SR 444 | 30.525 | 95.0 | No | Yes |
| SR 586 | 1.65 | 2.5 | | |
| I 184 | 0.825 | 2.5 | | |
| EtOAc | 67.00 | 0 | | |
| Ex. 26B | | | | |
| SR 444 | 30.525 | 92.5 | Yes | Yes |
| SR 586 | 1.65 | 5 | | |
| I 184 | 0.825 | 2.5 | | |
| EtOAc | 67.00 | 0 | | |

TABLE 24

| Comp. Ex. 24A (WO 2011/094342 A1) | | | | |
|---|---|---|---|---|
| Component | Wt. % in solution | Wt. % in dry solid | Sharpie removable | Compatibility |
| SM-SiO$_2$ | 19.9 | 35.9 | No | Yes, Glossy |
| SR 444 | 12.80 | 50.8 | | |
| SR 344 | 2.10 | 8.3 | | |
| SR 586 | 0.6 | 2.5 | | |
| I 184 | 0.6 | 2.5 | | |
| IPA | 24.6 | 0 | | |
| EtOAc | 39.40 | 0 | | |

What is claimed is:

1. A dry erase article comprising:
   a writable surface layer comprising a cured hardcoat composition comprising at least 2.8 wt.-% and less than 9.5 wt.-% of
   i) the reaction product of a compound comprising a C18-C36 hydrocarbon group and an ethylenically unsaturated group; or
   ii) the reaction product of a mixture of compounds comprising first compounds comprising a C18-C36 hydrocarbon group and an ethylenically unsaturated group and second compounds comprising a C8-C17 hydrocarbon group and an ethylenically unsaturated group wherein the first and second compound are present at a weight ratio of 3:2 to 4:1.

2. The dry erase article of claim 1 wherein at least one of the compounds comprising a C18-C36 hydrocarbon group has the formula $$R^1\text{-}L\text{-}R^2$$

wherein $R^1$ is a C18-36 hydrocarbon group;
L is a covalent bond, a divalent atom, or a hydrophobic divalent liking group;
$R^2$ is an ethylenically unsaturated group.

3. The dry erase article of claim 1 wherein at least one C18-36 hydrocarbon group is a linear alkylene group.

4. The dry erase article of claim 1 wherein at least one ethylenically unsaturated group is a (meth)acrylate group or a vinyl group.

5. The dry erase article of claim 1 wherein at least one compound comprising the C18-C36 hydrocarbon group is solid at 25° C.

6. The dry erase board of claim 1 wherein the hardcoat comprises the reaction product of one or more polymerizable materials.

7. The dry erase article of claim 6 wherein the hardcoat comprises at least 60 wt.-% of polymerized units of ethylenically unsaturated monomer having at least two ethylenically unsaturated groups and a Tg of at least 75° C.

8. The hardcoat of claim 7 wherein the hardcoat is free of inorganic oxide particles.

9. The dry erase article of claim 7 wherein the hardcoat comprises at least 60 wt.-% of polymerized units of ethylenically unsaturated monomer having at least two ethylenically unsaturated groups and a Tg of at least 75° C.

10. The hardcoat of claim 9 wherein the hardcoat is free of inorganic oxide particles.

11. The dry erase article of claim 6 wherein the hardcoat comprises at least 60 wt.-% of polymerized units of ethylenically unsaturated oligomers having at least two ethylenically unsaturated groups.

12. The dry erase article of claim 6 wherein the oligomers are selected from polyester acrylate oligomers or urethane acrylate oligomers.

13. The dry erase board of claim 1 wherein the hardcoat comprises at least 30 wt.-% of polymerized units of ethylenically unsaturated monomer or oligomers having at least two ethylenically unsaturated groups and a Tg of at least 75° C. and inorganic oxide particles.

14. The dry erase article of claim 1 wherein permanent marker can be completely removed from the surface layer when tested according to the Test for Permanent Marker Erasability.

15. The dry erase article of claim 1 wherein the writable surface layer is disposed upon an organic polymeric base member.

16. The dry erase article of claim 15 wherein the organic polymeric base member is a film.

17. The dry erase article of claim 15 wherein the base member is transparent or translucent.

18. The dry erase article of claim 1 wherein the surface layer further comprises silicone monomers, oligomers, or polymers.

19. A dry erase article comprising:
a writable surface layer comprising a cured hardcoat composition comprising the reaction product of a mixture of compounds comprising first compounds comprising a C18-C36 hydrocarbon group and an ethylenically unsaturated group and second compounds comprising a C8-C17 hydrocarbon group and an ethylenically unsaturated group wherein the first and second compound are present at a weight ratio of 3:2 to 4:1.

20. The dry erase article of claim 19 wherein the mixture of compounds is present in an amount ranging from at least 2.8 wt.-% and less than 9.5 wt.-% of the cured hardcoat composition.

21. The dry erase board of claim 19 wherein the hardcoat comprises at least 30 wt.-% of polymerized units of ethylenically unsaturated monomer or oligomers having at least two ethylenically unsaturated groups and a Tg of at least 75° C. and inorganic oxide particles.

22. The dry erase article of claim 19 wherein the writable surface layer is disposed upon an organic polymeric base member.

23. The dry erase article of claim 22 wherein the base member is transparent or translucent.

24. The dry erase article of claim 19 wherein the surface layer further comprises silicone monomers, oligomers, or polymers.

* * * * *

UNITED STATES PATENT AND TRADEMARK OFFICE
CERTIFICATE OF CORRECTION

PATENT NO. : 10,787,589 B2  
APPLICATION NO. : 16/484518  
DATED : September 29, 2020  
INVENTOR(S) : Jing et al.

Page 1 of 1

It is certified that error appears in the above-identified patent and that said Letters Patent is hereby corrected as shown below:

On the Title Page

Item (22) Column 1, Line 16, delete "Feb. 19," and insert -- Feb. 09, --

In the Claims

Column 22, Line 51, delete "C18-36" and insert -- C18-C36 --

Column 22, Line 56, delete "C18-36" and insert -- C18-C36 --

Column 22, Line 63, delete "dry erase board" and insert -- dry erase article --

Column 22, Line 66, delete "dry erase board" and insert -- dry erase article --

Column 23, Line 18, delete "dry erase board" and insert -- dry erase article --

Column 24, Line 19, delete "dry erase board" and insert -- dry erase article --

Signed and Sealed this  
Tenth Day of August, 2021

Drew Hirshfeld  
*Performing the Functions and Duties of the*  
*Under Secretary of Commerce for Intellectual Property and*  
*Director of the United States Patent and Trademark Office*